Dec. 24, 1957

C. L. FENDER 2,817,708

AMPLIFIER WITH TREMOLO

Filed Jan. 16, 1956

INVENTOR
CLARENCE L. FENDER
Lyon & Lyon
ATTORNEYS

United States Patent Office 2,817,708

Patented Dec. 24, 1957

2,817,708

AMPLIFIER WITH TREMOLO

Clarence L. Fender, Fullerton, Calif.

Application January 16, 1956, Serial No. 559,227

6 Claims. (Cl. 179—1)

The present invention relates to means and techniques for obtaining amplitude tremolo or vibrato effects, and is particularly useful in conjunction with all electrically amplified musical instruments, although, of course, the arrangement disclosed herein has utility with other sound or tone generators.

The arrangement disclosed herein is capable of amplifying signals of audible frequencies, using a phase splitting network in which the amplified signals are modulated to produce a tremolo or vibrato effect; and for these general purposes, a variable frequency audio oscillator is employed as the modulating source.

One of the features of the present invention is the manner in which modulation is accomplished. Another important feature resides in the means employed for initiating oscillations in the oscillator without any substantial undesirable time delay.

An object of the present invention is to provide an arrangement for obtaining the above-indicated results.

A specific object of the present invention is to provide improved means and techniques for obtaining tremolo or vibrato effects using apparatus which is relatively simple, inexpensive and easy to adjust.

Another specific object of the present invention is to provide an arrangement of this character in which the audio oscillator, for modulation purposes, is set into operation without any substantial undesirable time delay.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings, in which:

Figures 1, 2:
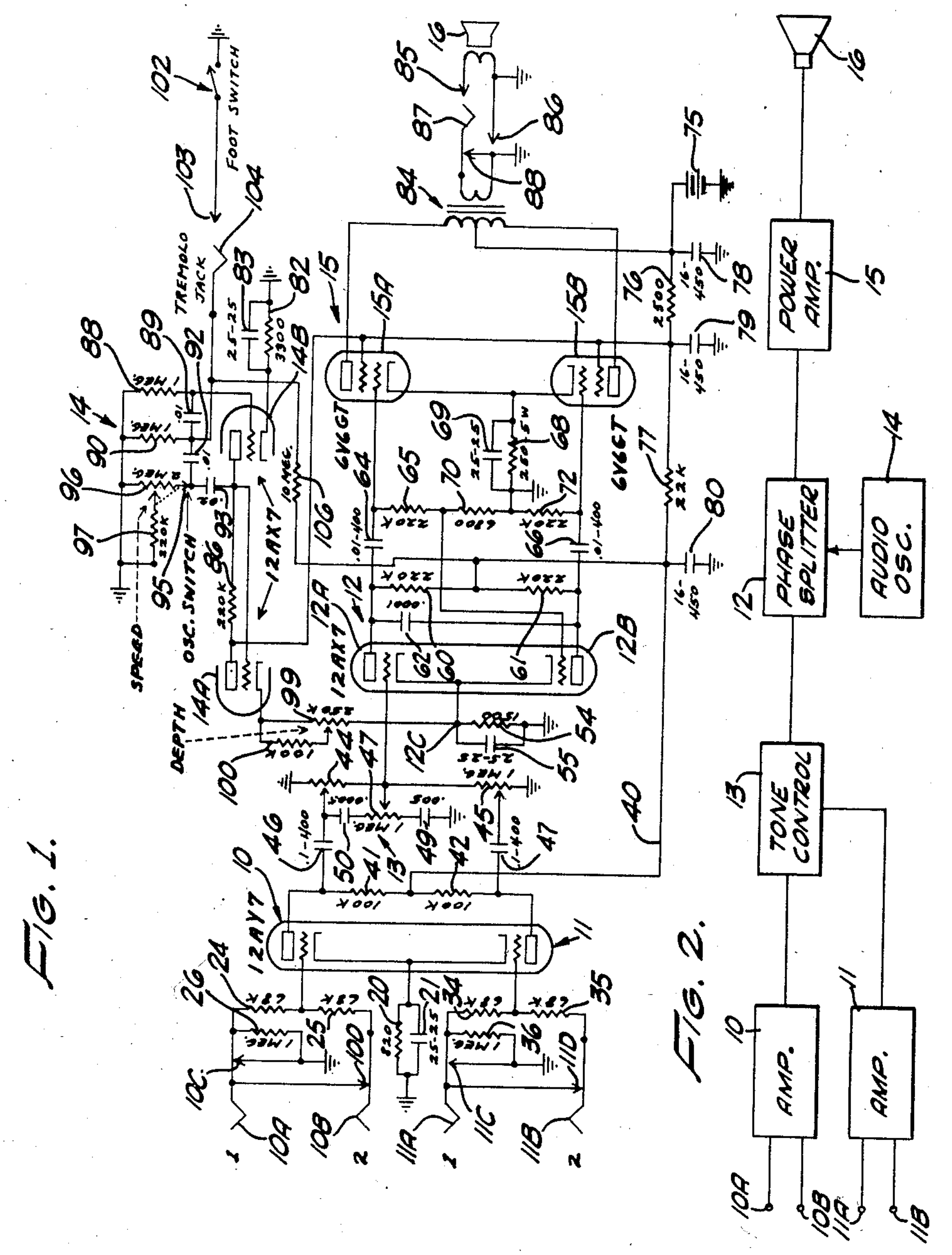
Figure 1 is a schematic diagram of apparatus embodying features of the present invention.
Figure 2 is a block diagram illustrating the apparatus shown in Figure 1.

In general, the arrangement includes a pair of amplifier stages 10 and 11 for receiving and amplifying audio frequency signals applied to either one of the terminals 10A, 10B, 11A, 11B, or applied simultaneously to a combination of such terminals, as desired. Such signals applied to the aforementioned terminals may be derived from any suitable sound source such as an electrical guitar, tone generator, electric organ and the like.

The outputs of the amplifiers 10 and 11 are applied to a phase splitting network 12 through a tone control circuit 13.

As shown in Figure 1, the network 12 includes a pair of tubes 12A, 12B, having a common cathode connection 12C to which the output of the variable frequency audio oscillator 14 is applied. The output of the stage 12 is applied to a push-pull amplifier stage 15 comprising the tubes 15A and 15B, and the output of the stage 15 is applied to the sound reproducer, such as the speaker 16.

The aforementioned terminals 10A, 10B, 11A, 11B are in the form of conventional plug-in jacks having associated therewith, respectively, the normally closed switches 10C, 10D, 11C and 11D. These switches are automatically opened when the connecting plug is inserted into the corresponding jack. The cathodes of each of the amplifying tubes 10 and 11 are common and return to ground through the biasing resistance 20 which is bypassed by the condenser 21. The control grid of tube 10 is connected to jacks 10A and 10B through corresponding resistances 24 and 25 of equal value. Jack 10A is normally grounded through the switch 10C which has one of its terminals grounded. Resistance 26 has one of its terminals connected to jack 10A and the other one of its terminals grounded. Jack 10B is normally grounded through the normally closed switches 10D and 10C.

In similar manner, the control grid of tube 11 is connected to jacks 11A and 11B through corresponding resistances 34 and 35 of equal value. The jack 11A is normally grounded by the normally closed switch 11C. The resistance 36 has one of its terminals grounded and has the other one of its terminals connected to jack 11A. Jack 11B is normally grounded through the normally closed switches 11D and 11C. It is assumed that, for present purposes, a plug is inserted in jack 10A in which case a signal is applied to the control grid of tube 10 through resistance 24, as well as through resistance 25, the switch 10C being open in that instance, and, of course, the switch 10D remains closed. The anodes of tubes 10 and 11 are connected to the high voltage or B+ lead 40 through corresponding resistances 41 and 42. The anodes of tubes 10 and 11 are also coupled respectively to corresponding taps on the volume control resistances 44 and 45 through corresponding coupling condensers 46 and 47. The tone control circuit 13 involves the tone control resistance 47 which has its tap connected to the ungrounded terminals of resistances 44 and 45 and the control grid of tube 12A, one outside terminal of resistance 47 being returned to ground through the condenser 49 and the other outside terminal of resistance 47 being connected to the tap on resistance 44 through condenser 50.

The cathodes of tubes 12A and 12B are connected to the junction point 12C and returned to ground through the self-biasing resistance 54 which is bypassed by condenser 55. At this junction point 12C the aforementioned output of the variable frequency oscillator is applied and thus the amplified signals are modulated as mentioned. By modulating the cathodes (i. e. varying the cathode bias) of tubes 12A and 12B simultaneously, pulse cancellation is achieved since the output of the oscillator circuit consists of regularly recurring pulses, and these would be audible from the loudspeaker were it not for the cancellation effect inherent in a push-pull amplifier stage when a signal is applied simultaneously to both tubes. The anodes of tubes 12A and 12B are connected to the B+ lead 40 through corresponding resistances 60 and 61 of equal value, and these anodes are interconnected by the bypass condenser 62 to neutralize any spurious oscillations which might occur. The signal developed on the anode of tube 12A is applied to the control grid of tube 12B through a circuit which includes the condenser 64 and resistance 65. Condenser 64 serves also to apply the signal from the anode of tube 12A to the control grid of the power amplifier tube 15A. The signal developed on the anode of tube 12B is applied through condenser 66 to the control grid of the other power amplifier tube 15B. The cathodes of tubes 15A and 15B are each returned to ground through the common biasing resistance 68 which is bypassed by condenser 69. The control grid of tube 15A is returned to ground through the aforementioned resistance 65 and the serially connected resistance 70. The control grid of tube 15B is returned to ground through the resistance 72.

The B+ lead 40 is connected to the ungrounded terminal of the voltage source 75 through voltage dropping resistances 76 and 77. Filter condenser 78 is connected across the source 75 which represents an alternating current rectifier. The junction point of resistances 76 and 77 is bypassed to ground through the filter condenser 79. Likewise, lead 40 is bypassed to ground by the filter condenser 80.

The screen grids of tubes 15A and 15B are connected to the junction point of resistances 76 and 77. The anodes of tubes 15A and 15B are connected directly to the positive terminal of source 75 through corresponding halves of the primary winding of output transformer 84. The voltage developed in the secondary winding of transformer 84 is applied to the speaker 16 through plugs 85 and 86. When the plug 85, as assumed, is plugged into the jack 87, the short-circuiting switch 88, normally connected across the secondary winding, is opened.

The audio oscillator 14, for obtaining tremolo or vibrato effects, is of the resistance-capacity type and includes tubes 14A and 14B. Tube 14B has its cathode returned to ground through the biasing resistance 82 which is bypassed by condenser 83. The anode of tube 14B is connected to the anode of tube 14A through resistance 86, and the anode of tube 14A is connected to the junction point of resistances 76 and 77.

The anode of tube 14B is coupled to the control grid of tube 14B through series condensers 93, 92 and 89, which are shunted to ground respectively by resistances 96, 90 and 88. This arrangement produces sufficient phase shift to cause tube 14B to oscillate at a relatively low frequency. The oscillating signal produced by tube 14B is applied to amplifier tube 14A by direct coupling between the anode of tube 14B and the control grid of tube 14A. This direct coupling is necessary because of the magnitude and low frequency of the signal to which the grid of tube 14A is subjected. Other forms of coupling are unsatisfactory due to the aforementioned two factors—magnitude and low frequency of the applied signal.

The junction point of condensers 92 and 93 is connectible by the so-called oscillator switch 95 to ground through the potentiometer type resistance 96 which has its tap returned to ground through the resistance 97. The oscillator switch 95 is preferably mechanically associated with the movable tap on resistance 96, using conventional means, such that the switch 95 is opened when the tap on resistance 96 is moved to a maximum position toward the grounded end of resistance 96. When the switch 95 is opened, audio oscillations in the oscillator stage 14 cease, and in such case no vibrato or tremolo effect is accomplished. The resistance 96 is referred to as a "speed" resistance since the tap thereon may be adjusted to produce oscillations of any one particular frequency in a continuous range of frequencies. The cathode of tube 14A is connected to the aforementioned junction point 12C through the potentiometer type resistance 99 which has its adjustable tap connected to one terminal of resistance 100, the other terminal of resistance 100 being connected to the cathode of tube 14A. The resistance 99 is referred to as a depth resistance, since adjustment of the tap serves to apply an adjustable voltage to the junction point 12C of predetermined intensity in a range of intensities.

Oscillations in the oscillator 14 may be controlled by not only the oscillator switch 95 but also by a normally open foot switch 102 which has one of its contacts grounded and the other one of its contacts connectible through the plug 103 and jack 104 to the junction point of elements 89, 90 and 92. This junction point, in accordance with important features of the present invention, is connected to the B+ lead 40 through the relatively high resistance 106, having a magnitude of approximately 10 megohms. When the foot switch 102 is closed, the aforementioned junction point is grounded and the oscillator 14 is disabled, i. e., does not generate oscillations. When, however, the foot switch 102 is open, the junction point of elements 89, 90 and 92 is no longer grounded and the oscillator is effective to develop oscillations (assuming switch 95 to be closed). It should be carefully observed, however, that such opening of switch 102 results in the application of a transient pulse to such junction point through the high resistance 106 so as to cause oscillator 14 to develop oscillations substantially immediately when the foot switch 102 is opened, to thereby avoid any undesirable time delay in operation of the oscillator circuit.

The aforementioned jacks 10A, 10B, 11A and 11B provide for coupling different sound sources to the tremolo amplifier thus far described. Thus, one sound source may be connected to the jack or terminal 10A and a second source may be connected to the terminal 10B, so that two different types of signals may be applied to the control grid of tube 10; and the tone of such signals may be adjusted by adjustment of the tap on the tone control resistance 13. Another alternative is that a sound source be connected to terminal 11A, or different sound sources be connected to terminals 11A and 11B so that signals from both sources may be applied to the control grid of tube 11; the tone of such signals may be adjusted by adjustment of the tap on the tone control resistance 13; and the volume may be controlled by adjustment of the tap on the volume control resistance 45. The comparable volume control in the other channel described previously, having input terminals 10A and 10B, is the volume control resistance 44.

In either one of the situations described above, a tremolo or vibrato effect may be accomplished by (1) operation of switch 95 (providing switch 102 is open or plug 103 is disengaged from jack 104), or by (2) operation of switch 102 (providing switch 95 is closed and jack 104 is engaged by plug 103). This vibrato or tremolo action is accomplished due to the modulation of the signal, applied to the input jacks, by the audio frequency voltage developed in the oscillator stage 14 and applied to the cathodes of tubes 12A and 12B. In other words, this action is obtained by varying the bias on tubes 12A and 12B and is in the form of cathode modulation.

While the particular embodiments of the present invention have been shown and described, it will be obvious to those skilled in the art that this tremolo device may be used in various sound amplifiers and that changes and modifications may be made without departing from this invention in its broader aspects and, therefore, the aim in the appended claims is to cover all such changes and modifications as fall within the true spirit and scope of this invention.

I claim:

1. In a system for producing tremolo effects, a voltage responsive audio oscillator for developing audio oscillations, a source of audio signals, a sound amplifying channel coupled to said source for amplifying said audio signals, means interconnecting said oscillator to said channel to modulate said audio signals by said audio oscillations, means for rendering said audio oscillator alternatively effective and ineffective, and means controlled by said last-mentioned means for applying a transient voltage to said oscillator to hasten the initiation of oscillations in said oscillator.

2. In a system for producing tremolo effects, an audio oscillator for developing audio oscillations, said audio oscillator including a tube having a control element, means for rendering said audio oscillator alternatively effective and ineffective, a source of voltage, and means controlled by said last-mentioned means for applying a transient voltage to said control element to hasten the initiation of oscillations in said oscillator.

3. In a system for producing tremolo effects, an amplifying channel, said channel including a pair of phase splitting tubes, said tubes having a common cathode connection, an audio oscillator having its output coupled to said common cathode connection, said audio oscillator including a tube which has a control element, a source of voltage, means for rendering said audio oscillator alternatively effective and ineffective, and means controlled by the last-mentioned means for applying a transient voltage to said control element, to hasten the initiation of oscillations in said oscillator.

4. An arrangement as set forth in claim 3 in which the means for rendering said audio oscillator alternatively ineffective and effective comprises a foot-operated switch.

5. In a system for producing tremolo effects, an audio oscillator including a tube which has a control element, a source of votlage, a relatively high resistance coupling said source to said control element, a switch serially connected with said source and said resistance, said oscillator being ineffective to develop oscillations when said switch is closed.

6. In a system for producing tremolo effects, an audio oscillator including a tube which has a control element, means including a switch coupled to said control element for rendering said oscillator alternatively effective and ineffective to develop oscillations, a source of voltage, and means effective upon operation of said switch to transfer transient voltage to said control element to hasten the initiation of oscillations in said oscillator upon operation of said switch.

References Cited in the file of this patent

UNITED STATES PATENTS 2,485,538 Rowe ---------------- Oct. 18, 1949